M. BASSETT.
STEAMER DEVICE FOR MILLINERY WORK.
APPLICATION FILED FEB. 28, 1920.
1,373,938.
Patented Apr. 5, 1921.
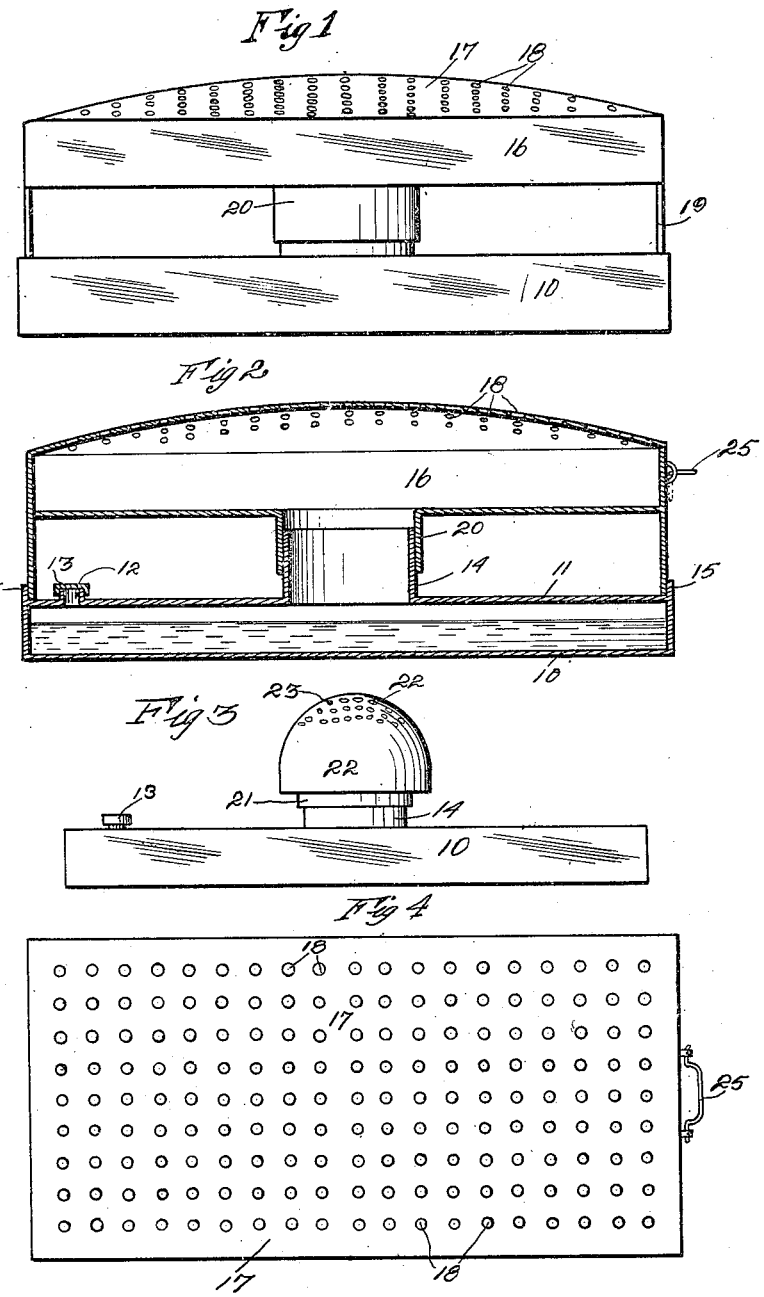

UNITED STATES PATENT OFFICE.

MAY BASSETT, OF DES MOINES, IOWA.

STEAMER DEVICE FOR MILLINERY-WORK.

1,373,938. Specification of Letters Patent. Patented Apr. 5, 1921.

Application filed February 28, 1920. Serial No. 361,981.

*To all whom it may concern:*

Be it known that I, MAY BASSETT, a citizen of the United States, and a resident of Des Moines, in the county of Polk and State of Iowa, have invented a certain new and useful Steamer Device for Millinery-Work, of which the following is a specification.

The object of my invention is to provide a steamer device of simple, durable and inexpensive construction adapted for use in millinery stores and establishments.

More particularly it is my object to provide a steamer device of the kind mentioned, having a tank comparatively shallow in which water may be quickly heated, which tank is provided with an upwardly extending supporting member, adapted to support what I shall for convenience call a steamer head, and to furnish a passage-way for steam.

A further object is to provide such a device adapted to support steamer heads of different shapes for doing different kinds of work.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 is a side elevation of a steamer device embodying my invention.

Fig. 2 is a longitudinal, central, sectional view through the same.

Fig. 3 is a side elevation of the steamer device, having installed thereon a different steamer head from that shown in Figs. 1 and 2; and Fig. 4 shows a top or plan view of the steamer head shown in Fig. 1.

In the accompanying drawings I have used the reference numeral 10 to indicate generally the water reservoir forming a part of my improved steamer device. The water reservoir 10 preferably comprises a comparatively shallow pan or the like, having a top or cover member 11, provided with an inlet passage 12, over which is a cap 13.

The cover 11 is also provided at its central portion with an upwardly extending cylindrical member 14. The member 14 serves as a support for the various forms of steamer heads, and also as a passage-way through which the steam from the reservoir may pass upwardly into the steamer head.

At its ends the reservoir 10 is preferably provided with short upwardly extending portions 15, shown in Fig. 2.

The reservoir 10 may be used with a considerable variety of steamer heads of different makes.

In the accompanying drawings, I have shown in Figs. 1, 2 and 4 a steamer head comprising a substantially flat shallow pan quite similar in its general construction to the pan or reservoir 10, indicated by the reference character 16. The steamer head, however, instead of having the top or cover like the reservoir 10, has a top 17 which is convex, and is curved from its central portion downwardly and outwardly in every direction.

The top 17 is provided with a large number of small holes 18, through which steam may escape. At the ends of the steamer head 16 are downwardly extending legs 19 adapted to rest on the top of the reservoir 10, adjacent to the upwardly extending member 15, for suitably bracing and supporting the steamer head.

In Fig. 3, I have shown mounted on the member 14, a different form of steamer head. It will be noted that the steamer head 16 has at its central portion of its bottom, a downwardly extending cylindrical member 20, adapted to telescopically receive the member 14.

Similarly the steamer head shown in Fig. 3, has a central, downwardly extending cylindrical member 21 adapted to slidably extend over the member 14.

At the upper ends of the member 21 is a hollow chamber having a top or cover member 22 shaped substantially like a head.

It may be mentioned, that the steamer heads shown herein are illustrative and that a great variety and number of shapes might be used for doing different kinds of work.

It will, of course, be understood that the cover member 22 of the steamer head shown in Fig. 3 is perforated with small holes 23 to permit the escape of steam.

Handles 24 are secured to the steamer head shown in Figs. 1 and 2.

In the practical use of my improved device, the steamer heads for the work planned should be placed on the reservoir, and the water in the reservoir may then be heated in any suitable way, as from a gas burner or otherwise.

The object in using a shallow pan is to make it possible to heat the water quickly for thereby producing steam in the shortest possible time.

The steam passes upwardly through the member 14 into the steamer head, and thence outwardly through the perforations in such head.

My device is used in a great many places in millinery establishments.

In renewing and refreshing velvet, the velvet is laid with the pile up on the steamer head. The steam passing upwardly through the velvet will cause the pile to stand up and make the velvet look fresh and new. This improves the appearance of new velvet which has been carried on a shelf or in storage.

Other millinery materials may be improved and freshened in appearance with my device.

A piece of material which has been made up into a hat or part of a hat may be steamed on a steamer head of the general shape shown in Fig. 3, if desired.

Other peculiarly shaped parts of material may be shaped on steamer heads of different kinds if desired.

Silk hat linings and the like, or hat parts made of buckram, or similar materials, where they have been stiffened with glue and similar materials, will sometimes get out of shape. Such millinery stock may be placed on a head such as that shown in Fig. 3, and steamed for softening the glue and for shaping the stock, and upon removal and drying the stock will be in the proper shape.

Some changes may be made in the construction and arrangement of my improved device without departing from the essential spirit and purpose of my invention, and it is my intention to cover by my claim any modified forms of structure or use of mechanical equivalents which may be reasonably included within their scope.

I claim as my invention:

A steamer device comprising a shallow container having a filler opening near one end and having a central opening in its top, a cylindrical member extending upwardly from said opening, said container having near its ends upwardly extending flanges, a steamer head having a bottom provided with a central opening and having a cylindrical member extending downwardly from said opening that receives said first cylindrical member, said steamer members having a curved perforated top, and being provided at its ends with downwardly extending supporting members adapted to rest on said receptacle adjacent to the upwardly extending flanges thereon.

Des Moines, Iowa, February 16, 1920.

MAY BASSETT.